(12) United States Patent
Downs et al.

(10) Patent No.: US 7,585,476 B2
(45) Date of Patent: Sep. 8, 2009

(54) PROCESS FOR CONTROLLING THE MOISTURE CONCENTRATION OF A COMBUSTION FLUE GAS

(75) Inventors: William Downs, Stark City, OH (US); Douglas J. Devault, Rootstown, OH (US); Dennis K. McDonald, Massillon, OH (US); Hamid Farzan, Stark County, OH (US)

(73) Assignee: Babcock & Wilcox Power Generation Group Inc., Barberton, OH (US)

( * ) Notice: Subject to any disclaimer, the term of this patent is extended or adjusted under 35 U.S.C. 154(b) by 201 days.

(21) Appl. No.: 11/733,942

(22) Filed: Apr. 11, 2007

(65) Prior Publication Data

US 2007/0243119 A1    Oct. 18, 2007

Related U.S. Application Data

(60) Provisional application No. 60/791,928, filed on Apr. 13, 2006.

(51) Int. Cl.
*B01D 53/34*    (2006.01)
*B01D 53/50*    (2006.01)
*B01D 53/62*    (2006.01)

(52) U.S. Cl. .................. 423/210; 423/228; 423/242.1; 423/243.01; 431/2; 431/5

(58) Field of Classification Search ............... 423/210, 423/228, 242.1, 243.01; 431/2, 5
See application file for complete search history.

(56) References Cited

U.S. PATENT DOCUMENTS

| 4,083,932 | A * | 4/1978 | Muraco et al. ............ 423/210 |
| 4,559,211 | A * | 12/1985 | Feldman et al. ......... 423/243.01 |
| 5,405,590 | A * | 4/1995 | Macedo et al. ............ 423/210 |
| 5,910,292 | A * | 6/1999 | Alvarez et al. ............ 423/210 |
| 6,733,735 | B2 * | 5/2004 | Kumada et al. ......... 423/243.08 |
| 2008/0112869 | A1 * | 5/2008 | MacKnight .............. 423/228 |

* cited by examiner

*Primary Examiner*—Timothy C Vanoy
(74) *Attorney, Agent, or Firm*—Michael J. Seymour; Eric Marich

(57) ABSTRACT

The present invention is related to a system for removal of moisture and contaminants from recirculated flue gas. The system includes a spray tower for spraying the flue gas with a liquid reagent to remove contaminants from the flue gas. A heat exchanger, integrally connected to the spray tower, cools the liquid reagent before the reagent is sprayed onto the flue gas stream. Cooled liquid reagent improves the condensation of the water vapor in the flue gas during the spraying process and provides a lower moisture content flue gas exiting the system. Combustion process efficiency improves as flue gas redirected to the burner for combustion contains.

20 Claims, 7 Drawing Sheets

PROCESS FOR CONTROLLING THE MOISTURE CONCENTRATION OF A COMBUSTION FLUE GAS

This application claims the benefit of U.S. Provisional Application No. 60/791,928, filed on Apr. 13, 2006.

FIELD AND BACKGROUND OF INVENTION

The present invention relates generally to the removal of moisture and contaminants from flue gas, and in particular to a new and unique method of utilizing a spray tower to regulate the moisture content of a flue gas.

Fossil fuel combustion is recognized as a major contributor to rising concentrations of carbon dioxide in the earth's atmosphere. The continually increasing carbon dioxide concentration has caused many governments and industries to examine the extensive use of fossil fuels and seek to develop new technologies for reducing carbon dioxide emissions. Major sources of carbon dioxide from fossil fuel utilization include coal-fired power plants, natural gas use for both power production and domestic heating and petroleum fuels for transportation. These three sources are believed to attribute to approximately 36%, 22% and 42%, respectively, of carbon dioxide emissions from fossil fuel fired combustion systems. As the use of coal at power plants represents a point source of carbon dioxide emissions, governments and power generators are focused on developing reliable means to control carbon dioxide emissions from these sources.

Current technologies proposed for capturing, transporting, and disposing of carbon dioxide from power generation facilities are energy intensive and expensive. The most mature $CO_2$ technology for capturing and concentrating carbon dioxide is absorption-stripping using various organic amines such as monoethanolamine, used commercially to remove $CO_2$ from raw natural gas. However, application of this technology to power generation facilities results in power losses exceeding 30% of plant output. Accordingly, a need exists amongst governments and industries which rely upon the combustion of coal to meet their energy requirements to develop economically viable carbon dioxide capture technologies for use in coal fired power generation facilities.

An alternative technology that offers the possibility of concentrating carbon dioxide in power plant flue gases with lower energy penalties than that of amine scrubbing is a technology generally known as oxy-combustion. In a normal combustion process a fuel is burned using ambient air containing about 21% oxygen and 78% nitrogen by volume. The carbon in the fuel reacts with the oxygen in the air to produce carbon dioxide and the hydrogen in the fuel reacts with the oxygen to produce water vapor. The gaseous products of combustion, generally known as flue gases, contain 10 to 15% $CO_2$ and 4 to 7% $H_2O$, and the balance comprising mostly of nitrogen. If the oxygen in the air can be separated from the nitrogen before combusting the fossil fuel, the combustion process would produce a flue gas containing much higher $CO_2$ and water vapor concentrations (typically around 3 times higher and possibly upwards of 5 times higher).

Substitution of concentrated oxygen for ambient air is one of the principal features of oxy-combustion. Another principal feature is flue gas recirculation. A schematic of an oxy-combustion boiler is shown in FIG. 1. Coal and oxygen are supplied to a boiler upstream of a particulate collector and a flue gas desulphurization means. The cleaned flue gas is then split into two streams, one recycled back into the combustion process and the other either vented to the atmosphere or conditioned for sequestration.

If an existing boiler were retrofitted with oxy-combustion technology, the furnace is designed to operate within at a prescribed temperature range, generally about 2500° F. to about 3000° F., and the heat transfer to the various parts of the boiler will have to be unaltered by the new oxy-combustion configuration. Yet, the substitution of oxygen for air can cause the combustion process to operate at significantly higher temperatures, sufficiently high in most case to cause irreparable damage to the furnace. Additionally, in retrofit applications, the mass flow of flue gas would be only about one fifth as much as the boiler was designed, causing the heat transfer distribution to the various components of the boiler to change in ways detrimental to the generation of steam for the turbine generator. However, if flue gases from the boiler exhaust were circulated back to the furnace, the oxygen introduced into the combustion system can be diluted with flue gas, such that the overall oxygen concentration of the oxygen enriched flue gas is near that of air.

By limiting the levels of oxygen introduction into the recirculated flue gas, the furnace can to operate within normal design conditions and the flue gas flow rate and temperature profiles through the rest of the steam generating sections can be made to match design conditions. The recirculated flue gas contains principally $CO_2$ and $H_2O$. Injection of oxygen into the recirculated flue gas, creates an oxygen enriched flue gas having an oxygen concentration approximately that of air, permitting the desired effect of oxy-combustion, i.e., the generation of steam for power production wherein a flue gas comprised significantly of carbon dioxide is produced, allowing for improved disposal of emissions, by means such as, but not limited to, sequestration.

Fossil fuels such as coal naturally comprise impurities such as sulfur, mineral matter, and mercury, the emissions of which must be controlled to meet existing and pending regulations. Since the flow rate of flue gas expelled from the oxy-combustion process would be about one fifth as much as that expelled from a conventional combustion process, the size of the dust collectors, desulphurization processes, and mercury capture devices could be potentially much smaller. However, the concentrations of all of these contaminants in a recirculated flue gas returning to the boiler can be up to five times higher than they would be in the exhaust of a conventional combustion process. For example, if the $SO_2$ concentration of a flue gas from a conventional combustion process is 1500 ppm, the $SO_2$ concentration of a recirculated flue gas can be around 7500 ppm. Similar comparisons can be made for particulate matter and mercury.

Sulfuric acid condensation in air heater and ultimately in the wet scrubber can further be exacerbated by the combined increase in $SO_2$ concentration and moisture concentration in the recirculated flue gas. Reduction in the concentration of any of these contaminants can be greatly improved if the contaminant removal device is placed in the recirculation loop. If done, the advantage of equipment size reduction is minimized, however in many applications, such as retrofits for example, where oxy-combustion is added to existing coal fired boilers, the deleterious effects of these contaminants upon furnace and boiler components is significantly reduced.

If a spray tower such as a flue gas desulphurization apparatus is moved into the recirculation loop to control $SO_2$ concentrations returning to the boiler, the moisture concentration of the flue gas is exacerbated. Wet scrubbers normally behave as adiabatic humidifier causing the moisture content of a flue gas passing there through to rise. For example for a typical high sulfur Illinois coal, the water vapor dew point temperature of flue gas can exceed 170 degrees Fahrenheit, making any recirculated flue gas unusable for coal drying in the pulverizer due to excessive moisture. To avoid potentially adverse impacts, a means of drying and reheating the recirculated flue gas if needed allowing the recirculated flue gas to be used in a pulverizer and as primary air for a coal fired burner.

One alternative is to add means to the recirculation loop to remove a significant portion of the moisture with a condensing heat exchanger. If both $SO_2$ and moisture are to be removed from the recirculated flue gas, a condensing heat exchanger could be located downstream of the desulfurization system. A schematic representation of a boiler with a condensing heat exchanger in a flue gas recycle loop is shown in FIG. 2. This arrangement was tested at pilot scale to remove moisture directly from the recirculating flue gas. While effective, the physical size of this condensing heat exchanger necessary proved prohibitive, and raised other concerns such as but not limited to the production of an acidic condensate.

Accordingly, a need exists for a more efficient, reliable, cost-effective means for removing excess moisture from the recirculated flue gas.

SUMMARY OF INVENTION

The present invention relates to a method of utilizing a spray tower to regulate the moisture content of a flue gas.

In one aspect the present invention provides a new and unique method of reducing the moisture concentration of flue gas, the method comprising the steps of providing a flue gas comprised of combustion gases, passing the flue gas through a spray tower apparatus having a flue gas inlet and a flue gas outlet, providing a liquid reagent, storing the liquid reagent in a liquid reagent storage means, regulating the temperature of the liquid reagent in the liquid reagent storage means at a temperature below that of the flue gas water vapor dew point at the flue gas inlet, and cooling the flue gas by spraying the liquid reagent on the flue gas within the spray tower apparatus.

In another aspect, the present invention provides a new and unique method of combustion comprising combusting a fossil fuel in the presence of oxygen using a burner, creating a flue gas from the step of combusting, removing sulfur dioxide from the flue gas with a spray tower apparatus, reducing the moisture of the flue gas with the spray tower apparatus, and recirculating a portion of the flue gas exiting the scrubber apparatus to the burner to facilitate further combustion.

Spray towers such as wet scrubbers normally operate as adiabatic humidifiers where hot flue gases, typically around 300° F. to 350° F., enter the wet scrubber and exchange sensible heat with the liquid reagent in exact equivalence with the latent heat required to evaporate a certain quantity of water. In this way, the liquid reagent temperature remains unchanged from the inlet to the outlet of the scrubber. The steady state temperature of the liquid reagent in equilibrium with the flue gas leaving the scrubber is called the adiabatic saturation temperature. The adiabatic saturation temperature typically ranges around 115° F. to 135° F. in conventional wet scrubber applications but could rise to above 160° F. in an oxy-combustion application.

A spray tower according to the present invention operates in a non-adiabatic mode. In a wet scrubber embodiment of the present invention, the liquid reagent is cooled to a temperature below the dew point of the flue gas entering the wet scrubber. As the flue gas passes through the wet scrubber, the flue gas is sprayed with the cooled liquid reagent, causing the flue gas to cool and a portion of the moisture within the flue gas to condense. The condensate, generally water, falls to the bottom of the wet scrubber, providing the additional benefit of being readily collectable for use as make-up water for the liquid reagent solution.

The temperature of the liquid reagent can be regulated though a heat exchange where the heat exchange fluid acts as a cold sink. A wet scrubber designed to remove $SO_2$ from flue gases, can without altering the basic $SO_2$ control parameters, be made to effectively condense water from moisture laden flue gases. A primary variable in the design of a wet scrubber is the rate at which liquid reagent (also know as a slurry) is sprayed into the liquid-gas contact zone of the scrubber. This spray rate can be expressed in normalized form as the spray flux, expressed in English engineering terms as gallons per minute of liquid per square feet of wet scrubber cross-sectional area. Or simply as $gpm/ft^2$. One measure of the effectiveness of a wet scrubber liquid to achieve effective contact with the flue gas is to observe how closely these two counter-currently flowing streams, the flue gas and the liquid approach in temperature. FIG. 3 is a graphical representation of the spray flux measured in gpm/ft2 versus the temperature difference of these two streams at the flue gas exit from the wet scrubber. The plot, generated from pilot testing, illustrate that moisture from a flue gas will condense in the wet scrubber to the extent that the temperature difference between the flue gas leaving the wet scrubber is within about one degree of the liquid temperature entering the absorber. In a preferred aspect, the present invention provides a method of controlling the moisture concentration of a combustion flue gas as it passes though a spray tower by regulating the temperature of the liquid reagent used in the spray tower.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The present invention generally relates to a method of utilizing a spray tower to regulate the moisture concentration of a flue gas. In embodiments wherein spray towers such as wet scrubbers are used, the present invention provides for a method of duel purpose, wherein contaminants such as $SO_2$ are removed in addition to the regulation of flue gas moisture concentration.

Figure 1:
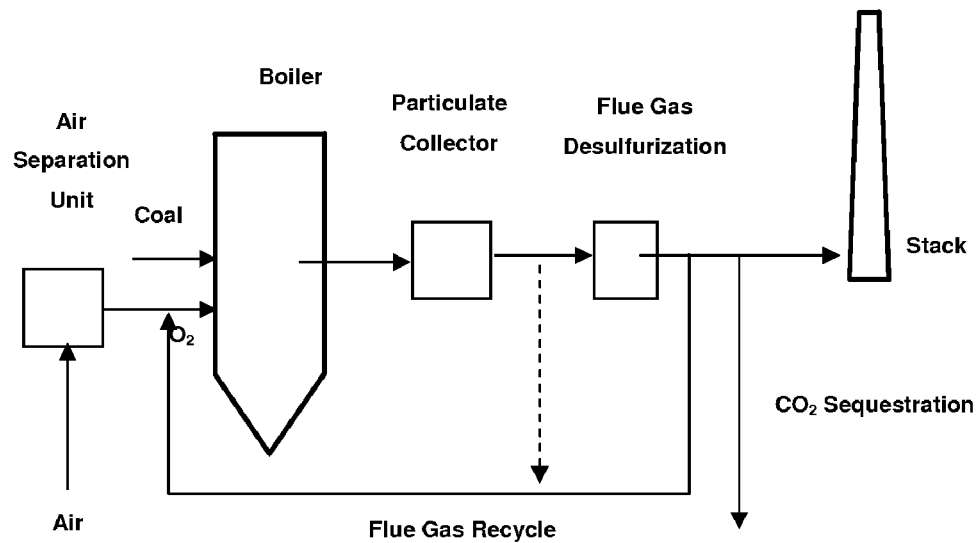
FIG. 1 is a schematic representation of an oxy-combustion boiler.
Figure 2:
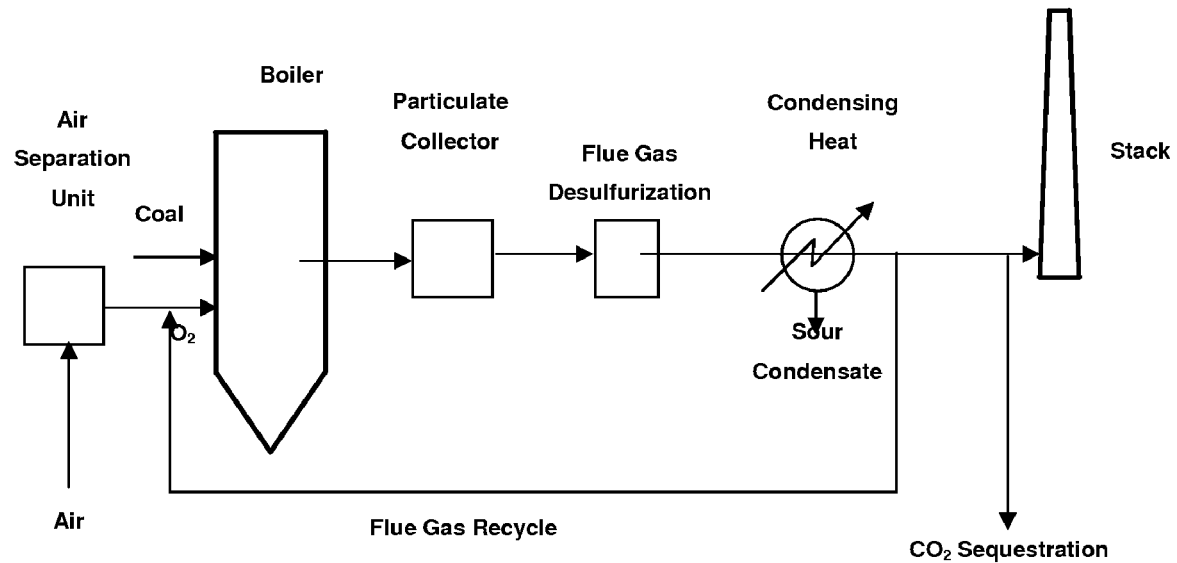
FIG. 2 is a schematic representation of a boiler with a condensing heat exchanger in a flue gas recycle loop.
Figure 3:
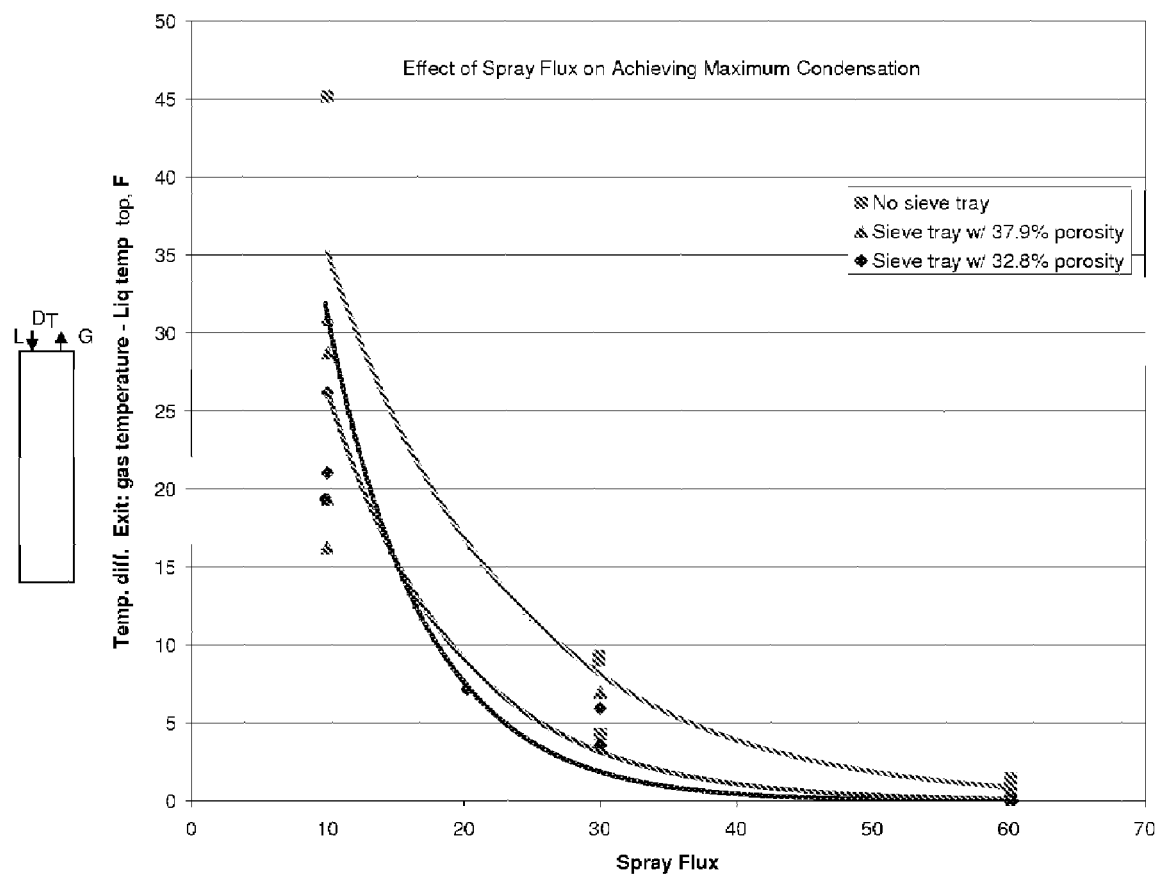
FIG. 3 is a graphical representation of Spray Flux vs. Delta T.
Figure 4:
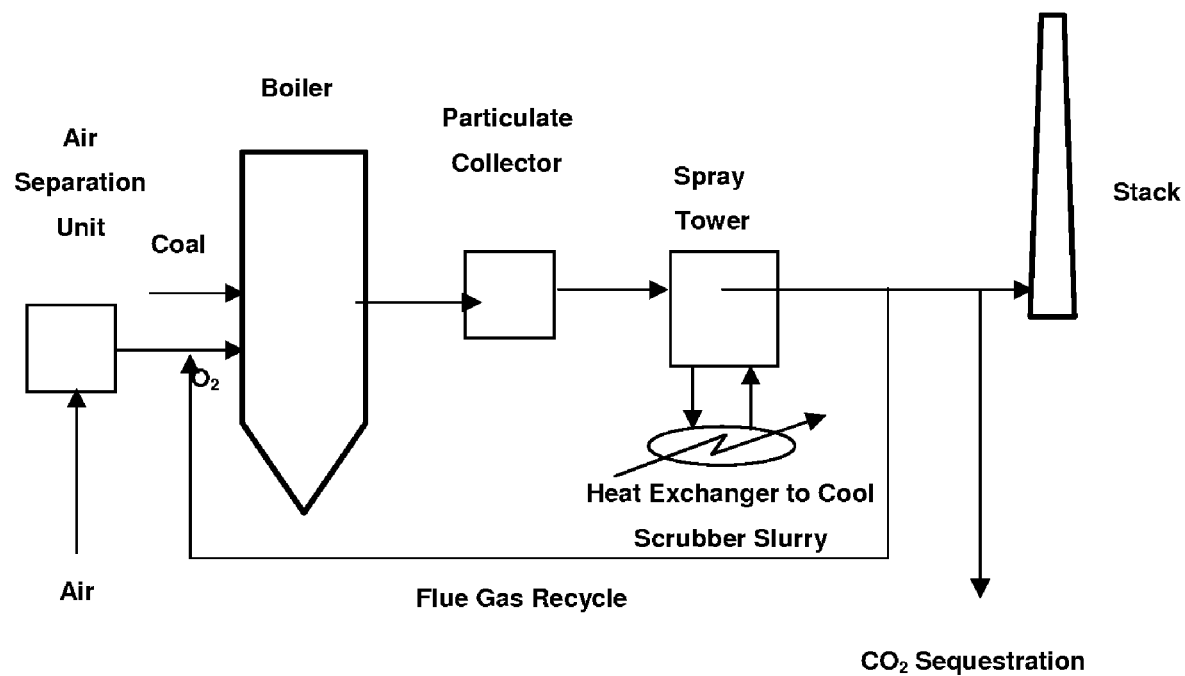
FIG. 4 is a schematic representation of a combustion process according the present invention.

Referring to FIG. 4, a schematic representation of a combustion process according the present invention if shown. Oxygen and coal are supplied to a boiler upstream of a particulate collector and a flue gas desulfurization unit. The flue gas desulfurization unit is equipped with a heat exchanger to cool the liquid reagent. The liquid reagent is cooled to a predetermined point below that of the flue gas inlet temperature water vapor dew point and sprayed into the flue gas. A portion of the cooled flue gas is then reheated and recirculated to the pulverizer and burners to facilitate combustion. The recirculated flue gas may be reheated as necessary with economizer exhaust gases in a gas-gas heat exchanger or by other heating means. Means of flue gas circulation and the process of coal-fired combustion, including the components therein, are discussed in detail in Steam 41, herein incorporated by reference.

While a wet scrubber is generally used in the present application to articulate an exemplary embodiments of the present invention, it is understood that a spray tower according to the present invention may be any tower contactor used in a combustion application wherein a liquid reagent is made to contact a flue gas in either a co-current, a counter-current, or both a counter and co-current manner.

Figure 5:
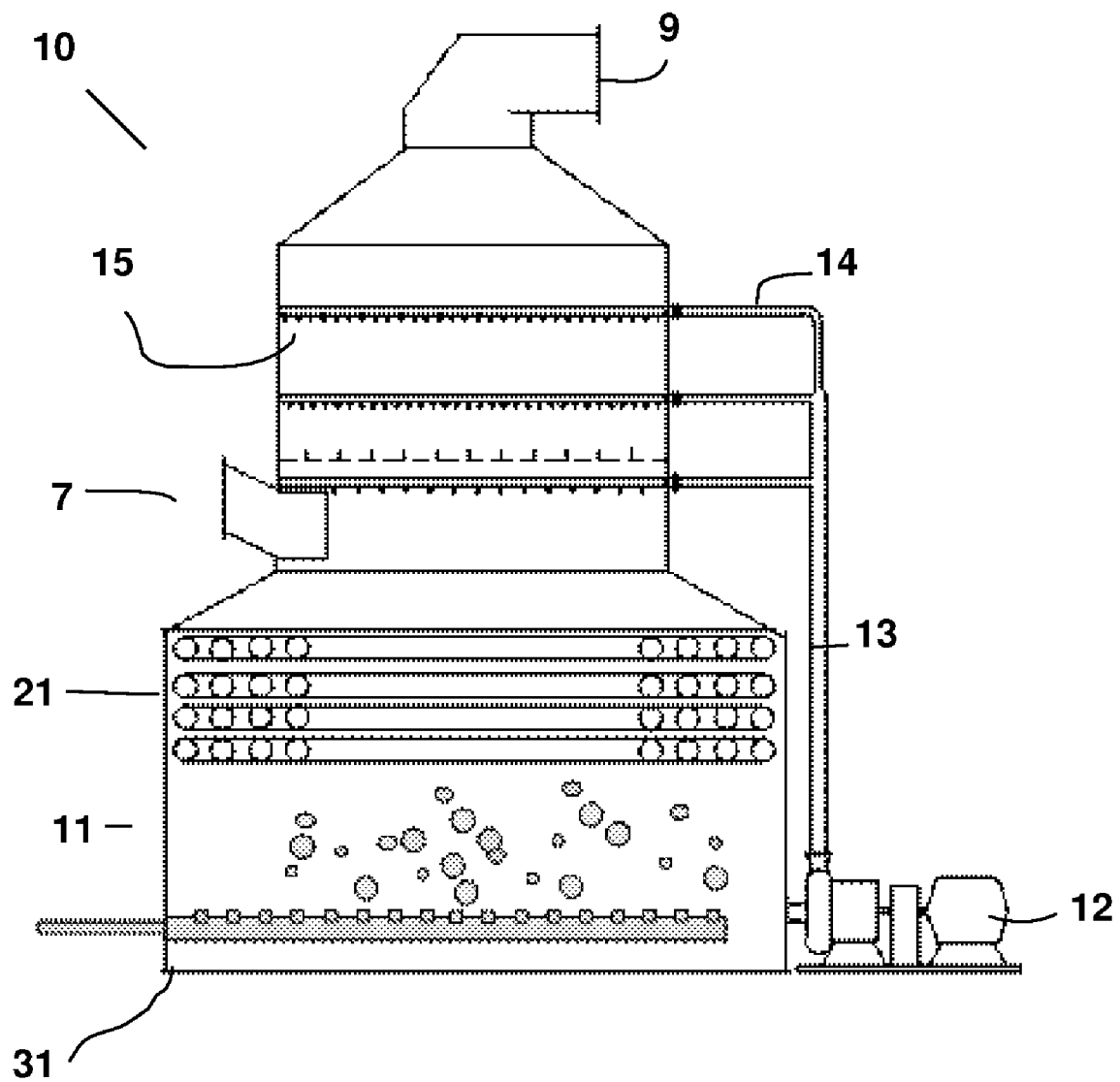
FIG. 5 is a spray tower embodiment of the present invention.

Referring now to FIG. 5, a spray tower 10 is shown. In a method according to the present invention flue gas enters spray tower 10 at flue gas inlet 7, and exits through flue gas outlet 9. Liquid reagent 31 is stored in liquid reagent storage means 11. Heat exchanger means 21 is located within spray tower 10 and at least partially submersed within the liquid reagent 31 contained with the liquid reagent storage means 11. Heat exchanger means 21 cools the liquid reagent 31 in the liquid reagent storage means 11 to a temperature near the desired flue gas outlet temperature. Pump 12 pumps the liquid reagent 31 from the tank liquid reagent storage means 11 upward through piping 13 to a sprayer assembly 14 mounted above the liquid reagent storage means 11. Sprayer assembly 14 has nozzles 15 which spray cooled liquid reagent 31 onto flue gas as it passes through spray tower 10. Upon contact the liquid reagent 31 cools the flue gas causing moisture to condense from the flue gas as fall into the liquid reagent storage means 11. The flue gas then exists the spray tower 10 at flue gas outlet 9 at a lower temperature than the flue gas had at the flue gas inlet 7 and with a reduced moisture content.

In an alternative embodiment, spray tower 10 is also utilized as a wet scrubber for the removal of $SO_2$. Liquid reagent 11, generally comprising an aqueous slurry of gypsum and limestone, is sprayed on flue gas providing the duel benefit of $SO_2$ capture and flue gas moisture control, wherein liquid regent is capable of achieving effective $SO_2$ capture.

In alternative spray tower embodiments, it is understood that the liquid reagent is not limited to gypsum and limestone, but can comprise of any aqueous solution necessary to remove a contaminant from a flue gas or perform a chemical reaction.

In a preferred embodiment a liquid-liquid heat exchange is used for cooling the liquid reagent. Cooling water, generally available at temperatures below 85° F. at power plants, in addition to other common cooling liquids such as glycol may be used to cool the liquid reagent. In one embodiment the liquid reagent is pumped in a loop to and from a shell and tube heat exchanger where the slurry flows through the tube side of the exchanger and the cooling water flows on the shell side. In alternative embodiment, the liquid reagent flows on the shell side.

Alternatively, a liquid/gas heat exchanger may be used, wherein any gas available at a power plant may be used as a cooling medium.

Figure 6:
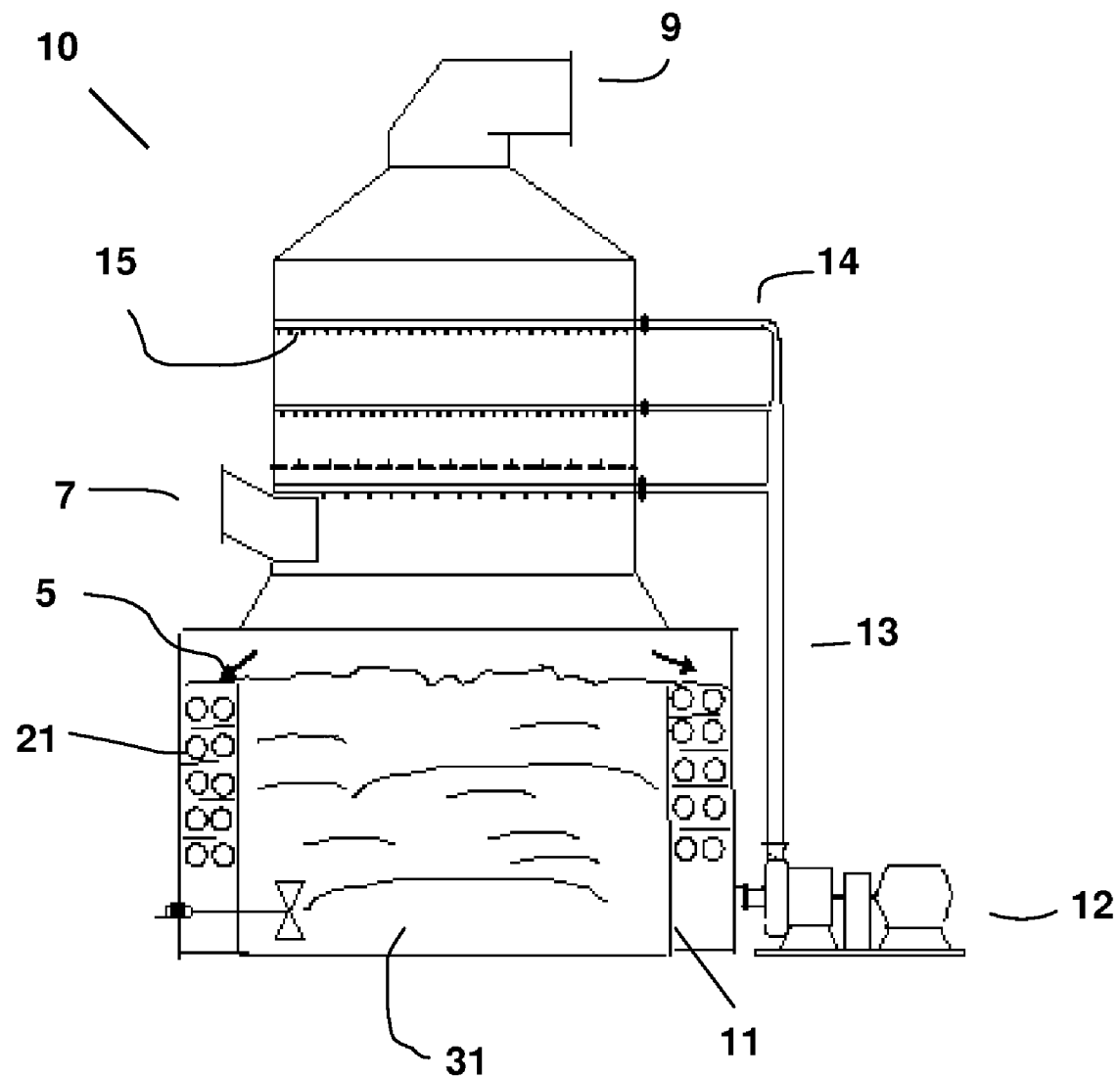
FIG. 6 is a spray tower embodiment of the present invention.

Referring now to FIG. 6, an alternative embodiment of the heat exchanger means 21 is shown. In this embodiment, heat exchanger means 21 is internal to the spray tower 10 but external to the liquid reagent storage means 11. Liquid reagent 31 is maintained in liquid reagent storage means 11 at a level that allows liquid reagent 31 to overflow the wall 5 of the liquid regent storage means 11. Overflow of liquid reagent 31 is then cooled by heat exchanger means as it flows over wall 5 of liquid reagent storage means 11 on its way to the recirculation pumps 12. Cooled liquid reagent 11 is then pumped to sprayer assembly 14 via piping 13, where spray headers 15 sprays the cooled liquid reagent 21 on the flue gas stream as it passes through spray dryer 10 for removal of flue gas contaminants, including $SO_2$, cooling the flue gas, and dehumidifying the flue gas. The condensed moisture from the flue gas and liquid reagent 31 eventually fall via gravity into the liquid reagent storage means 11.

Figure 7:
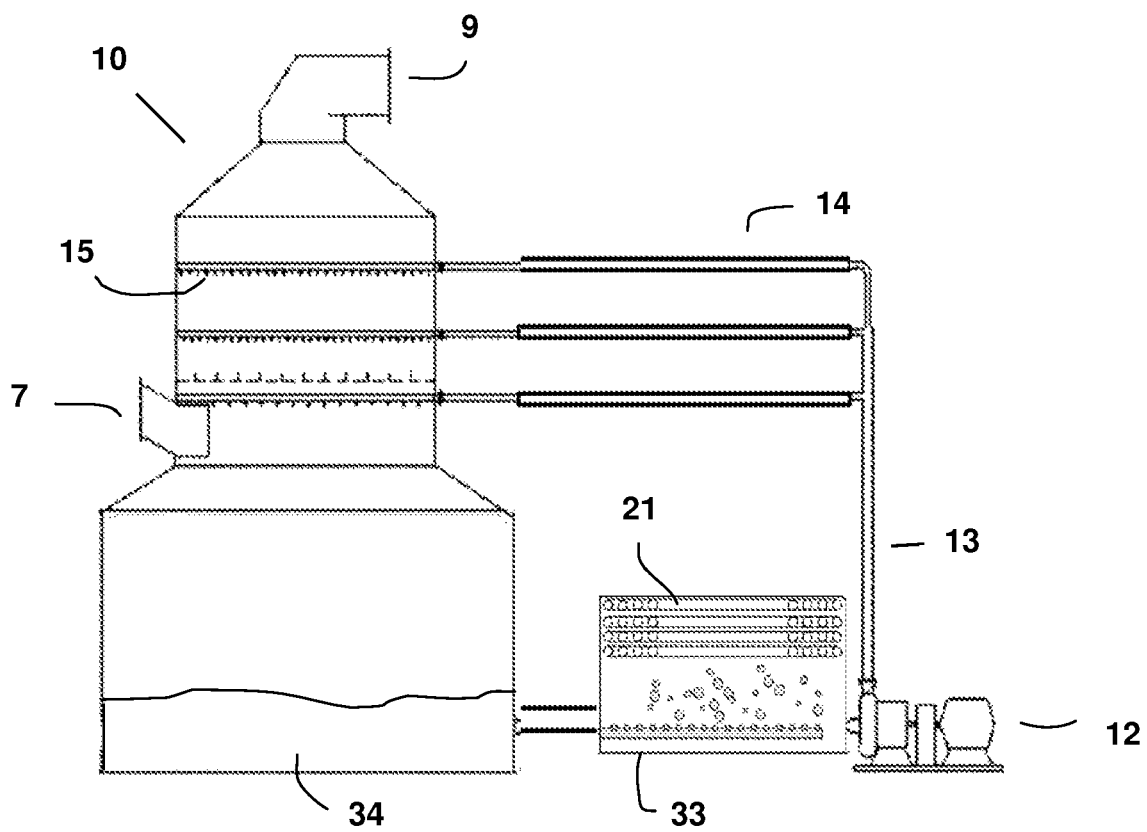
FIG. 7 is a spray tower embodiment of the present invention.

Referring now to FIG. 7, an alternative embodiment of the liquid reagent storage means 11 is shown. In this embodiment, heat exchanger means 21 is located external to the spray tower 10, at least partially immersed in an external liquid reagent storage means 33. Flue gas condensate and sprayed liquid reagent are collected at the bottom of the spray tower 34 and flow to liquid reagent storage means where heat exchanger means 21 cools liquid reagent 11, prior the liquid reagent 11 being sprayed onto the flue gas as the flue gas passes though the spray tower 10.

Figure 8:
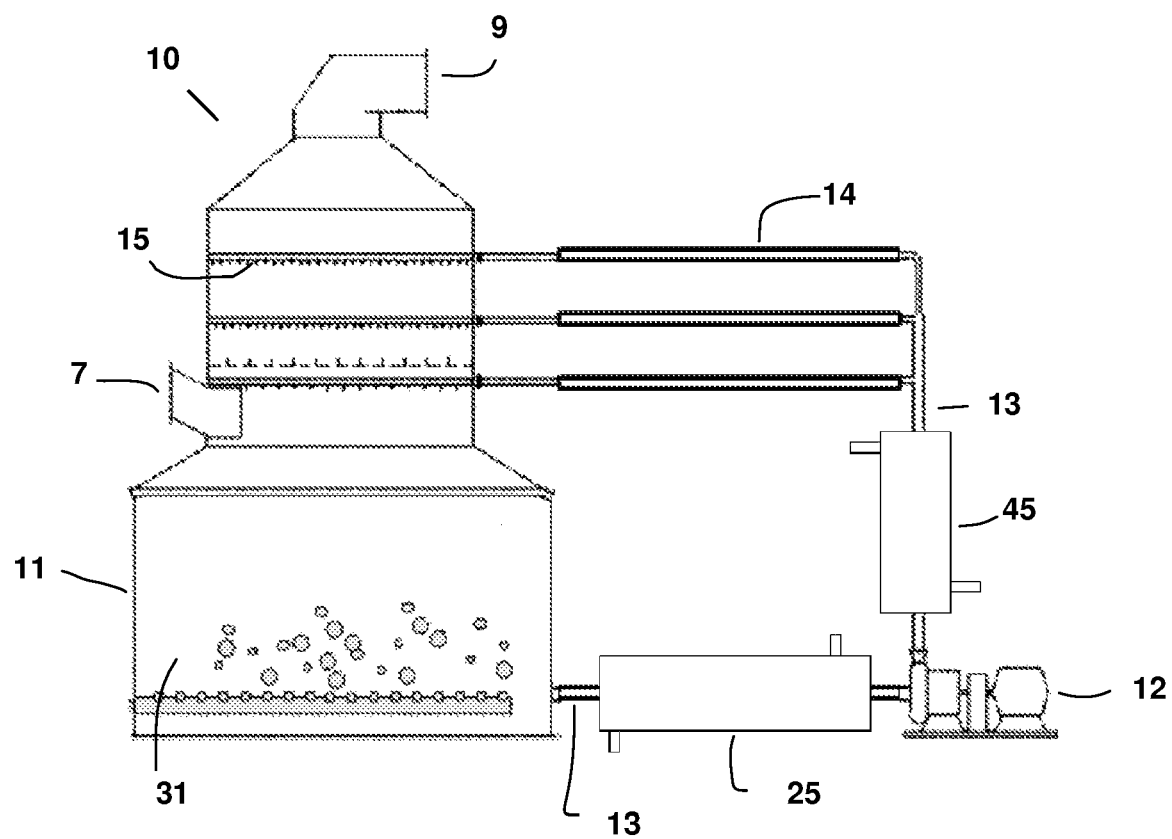
FIG. 8 is a spray tower embodiment of the present invention.

Referring now to FIG. 8, and alternative embodiment of the heat exchanger means is shown. In this embodiment, heat exchanger means is located external to spray tower 10 and cools the liquid reagent 31 as if passes though piping 13 after being pumped out of the liquid reagent storage means 11. A heat exchanger means 25 can be placed before pump 12. A heat exchanger means 45 could also be placed after pump 12. In an alternative embodiment multiple heat exchanger means could also be used such the there are multiple external heat exchanger means 25, 45, or any combination of both internal and external heat exchanger means.

The present invention can provide several advantages over the known flue gas scrubbing devices. The simultaneous desulfurization and dehumidification in a single device provides a particular advantage to oxy-combustion where the process is served to advantage by the dual benefits of flue gas desulfurization and dehumidification in a single device. Submerging the heat transfer surface into the liquid reagent means further reduces the space required to operate the system and reduces the possibility of surface fouling by slurry solids.

Amine scrubbing is an alternative to oxy-combustion, wherein an amine scrubbing unit removes carbon dioxide from the combustion flue gas. In an alternative embodiment of the present invention, the spray tower may be placed upstream of an amine scrubbing system. To operate effectively, amine scrubbing requires the flue gas to enter the amine scrubber at a lower moisture content and at a significantly cooler temperature than that of flue gases exiting conventional flue gas desulfurization devices. Typically, a separate cooling unit is placed downstream of the conventional flue gas desulfurization device and upstream of the amine scrubber to cool the flue gas prior to entering the amine scrubber. When used in an amine scrubbing application, a spray tower of the present invention placed upstream of the amine scrubber provides a means for removing flue gas contaminants such as sulfur dioxide and the additional benefit of cooling the flue gas to a temperature below the water vapor dew point of the inlet flue gas, thereby eliminating the need for a separate flue gas cooler.

In yet another alternative embody, the spray tower is of a pumpless scrubber design.

While a specific embodiment of the invention has been shown and described in detail to illustrate the application of the principles of the invention, it will be understood that the invention may be embodied otherwise without departing from such principles.

We claim:

1. A method of reducing the moisture concentration of flue gas comprising:
   providing a flue gas comprised of combustion gases,
   passing the flue gas through a spray tower apparatus having a flue gas inlet and a flue gas outlet,
   providing a liquid reagent;
   storing the liquid reagent in a liquid reagent storage means,
   reducing the temperature of the liquid reagent in the liquid reagent storage means at a temperature below that of the flue gas water vapor dew point at the flue gas inlet,
   cooling the flue gas by spraying the liquid reagent on the flue gas within the spray tower apparatus;
   condensing moisture from the flue gas by spraying the liquid reagent on the flue gas within the spray tower apparatus; and
   recirculating a portion of the flue gas exiting the spray tower apparatus to a burner to facilitate combustion.

2. The method of claim 1, wherein a heat exchanger regulates the liquid reagent temperature.

3. The method of claim 2, wherein at least a portion of the heat exchanger is submerged in the liquid reagent.

4. The method of claim 3, wherein the heat exchanger is a liquid/liquid heat exchanger.

5. The method of claim 3, wherein the heat exchanger is a gas/liquid heat exchanger.

6. The method of claim 4, further comprising the step of using water in the liquid/liquid heat exchanger to maintain the temperature of the liquid reagent.

7. The method of claim 3, further comprising the step of removing sulfur dioxide from the flue gas with the liquid reagent.

8. The method of claim 7, wherein the liquid reagent is sprayed counter current to the flue gas.

9. The method of claim 7, wherein the liquid reagent is sprayed co-current to the flue gas.

10. The method of claim 7, wherein the composition of flue gas is substantially nitrogen.

11. The method of claim 7, where in composition of the flue gas is substantially carbon dioxide.

12. The method of claim 11, wherein the liquid reagent storage means is located within the spray tower apparatus.

13. The method of claim 11, wherein the liquid reagent storage means is external to the spray tower apparatus.

14. The method of claim 13, further comprising the step of regulating the temperature of the liquid reagent in the liquid reagent storage means at a temperature below that of the flue gas at the flue gas outlet.

15. A method of combustion comprising
    combusting a fossil fuel in the presence of oxygen using a burner,
    creating a flue gas from the step of corn busting,
    removing sulfur dioxide from the flue gas with a spray tower apparatus,
    reducing the moisture of the flue gas with the spray tower apparatus;
    cooling the flue gas with the liquid reagent as the flue gas passes through the spray tower apparatus; and
    recirculating a portion of the flue gas exiting the scrubber apparatus to the burner to facilitate further combustion.

16. The method of claim 15, further comprising the step of using a liquid reagent in the spray tower apparatus to remove the sulfur dioxide from the flue gas.

17. The method of claim 16, further comprising the step of maintaining the temperature of the liquid reagent with a heat exchanger.

18. The method of claim 17, further comprising the step of recirculating a portion of the flue gas exiting the spray tower apparatus to a pulverizer.

19. The method of claim 18, wherein the composition of the flue gas entering the spray tower apparatus is substantially comprised of carbon dioxide.

20. A method of combustion comprising
    combusting a fossil fuel in the presence of oxygen using a burner,
    creating a flue gas from the step of corn busting,
    removing sulfur dioxide from the flue gas with a spray tower apparatus,
    reducing the moisture of the flue gas with the spray tower apparatus;
    cooling the flue gas with the liquid reagent as the flue gas passes through the spray tower apparatus; and
    removing carbon dioxide from the flue gas downstream of the spray tower with an amine scrubber.

* * * * *

UNITED STATES PATENT AND TRADEMARK OFFICE
CERTIFICATE OF CORRECTION

PATENT NO. : 7,585,476 B2
APPLICATION NO. : 11/733942
DATED : September 8, 2009
INVENTOR(S) : Downs et al.

It is certified that error appears in the above-identified patent and that said Letters Patent is hereby corrected as shown below:

Claim 15 (column 8, line 14) the term "corn busting" should be "combusting".

Claim 20 (column 8, line 38) the term "corn busting" should be "combusting".

Signed and Sealed this

Ninth Day of March, 2010

David J. Kappos
*Director of the United States Patent and Trademark Office*